(12) United States Patent
Jones et al.

(10) Patent No.: US 10,462,244 B2
(45) Date of Patent: *Oct. 29, 2019

(54) SYNDICATED CLOUD-BASED NOTIFICATION AS A SERVICE

(71) Applicant: International Business Machines Corporation, Armonk, NY (US)

(72) Inventors: Gregory L. Jones, Rome, PA (US); Michael O. Tingey, Vestal, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 697 days.

This patent is subject to a terminal disclaimer.

(21) Appl. No.: 14/989,888

(22) Filed: Jan. 7, 2016

(65) Prior Publication Data
US 2017/0201593 A1 Jul. 13, 2017

(51) Int. Cl.
*H04L 29/06* (2006.01)
*H04L 29/08* (2006.01)
*H04L 12/58* (2006.01)

(52) U.S. Cl.
CPC ........... *H04L 67/26* (2013.01); *H04L 51/24* (2013.01); *H04L 67/02* (2013.01); *H04L 67/025* (2013.01); *H04L 67/306* (2013.01)

(58) Field of Classification Search
CPC ......... H04L 67/26; H04L 51/24; H04L 67/02; H04L 67/025; H04L 67/306
(Continued)

(56) References Cited

U.S. PATENT DOCUMENTS 6,493,703 B1 * 12/2002 Knight ............ G06F 17/30702
8,606,923 B2 12/2013 Tekwani
(Continued)

FOREIGN PATENT DOCUMENTS

| CN | 103597846 A | 2/2014 |
| EP | 2226992 A1 | 9/2010 |

OTHER PUBLICATIONS

"Amazon Simple Notification Service," API Reference, API Version Mar. 31, 2010, http://docs.aws.amazon.com/sns/latest/api/sns-api.pdf , 76 pages.
"Amazon Simple Notification Service," CLI Reference, API Version Mar. 31, 2010, http://docs.aws.amazon.com/sns/latest/cli/sns-cli.pdf , 24 pages.
(Continued)

*Primary Examiner* — Moustafa M Meky
*Assistant Examiner* — Elizabeth Kassa
(74) *Attorney, Agent, or Firm* — Cantor Colburn LLP; Edward Wixted

(57) ABSTRACT

A computer-implemented method for notifying of content changes includes monitoring, by a computer processor, a content source of a content provider. That monitoring includes periodically reading a Notification as a Service (NaaS) extension in a Rich Site Summary (RSS) feed associated with the content source, where the NaaS extension defines a plurality of interest categories of the content source. New content is identified in the content source, based on periodically reading the NaaS extension, and the new content is associated with a first interest category of the plurality of interest categories. A user is identified as being subscribed to receive notifications of content changes in the first interest category. The user is notified of the new content, responsive to the new content being associated with the first interest category and the user being subscribed to receive notification of content changes in the first interest category.

14 Claims, 9 Drawing Sheets

(58) Field of Classification Search
USPC .......................................................... 709/206
See application file for complete search history.

(56) References Cited

U.S. PATENT DOCUMENTS

| | | | |
|---|---|---|---|
| 8,630,624 B2 | 1/2014 | Marcellino | |
| 9,659,104 B2* | 5/2017 | Soon-Shiong | G06F 17/3089 |
| 2007/0100959 A1* | 5/2007 | Eichstaedt | H04L 67/306 |
| | | | 709/217 |
| 2008/0228574 A1* | 9/2008 | Stewart | G06Q 30/0273 |
| | | | 705/14.69 |
| 2009/0077124 A1* | 3/2009 | Spivack | G06Q 30/02 |
| 2013/0144974 A1* | 6/2013 | Haakenson | H04L 67/26 |
| | | | 709/217 |
| 2013/0159295 A1* | 6/2013 | Gross | G06F 17/30867 |
| | | | 707/724 |
| 2013/0227617 A1* | 8/2013 | Carney | H04N 5/44543 |
| | | | 725/61 |
| 2013/0346589 A1 | 12/2013 | Leshko et al. | |
| 2014/0337405 A1 | 11/2014 | Athas et al. | |
| 2015/0026356 A1 | 1/2015 | Kaplinger et al. | |
| 2015/0304186 A1 | 10/2015 | O'Sullivan | |
| 2017/0134516 A1* | 5/2017 | Gutman | H04L 67/26 |
| 2017/0201483 A1 | 7/2017 | Jones | |

OTHER PUBLICATIONS

"Amazon Simple Notification Service," Developer Guide, API Version Mar. 31, 2010, http://docs.aws.amazon.com/sns/latest/dg/sns-dg.pdf , 185 pages.

Eichhorn, Philipp, "A Notification Service for an Open Data Service," Bachelor Thesis, Friedrich-Alexander-Universitat Erlangen-Nürnberg Technische Fakultät, Department Informatik, 2014, 42 pages.

Gusev, Marjan, et al., "Alert Notification as a Service," 2014 37th International Convention on Information and Communication Technology, Electronics and Microelectronics (MIPRO), pp. 319-324, IEEE, 2014.

Gusev, Marjan, et al., "Scalable Architecture of Alert Notification as a Service," 2014 International Conference on Information Society (i-Society), pp. 80-85, IEEE, 2014.

Palanivel et al., "Architecture Solutions to E-Learning Systems Using Service-Oriented Cloud Computing Reference Architecture," International Journal of Application or Innovation in Engeneering & Management (IJAIEM), vol. 3, Issue 3, Mar. 2014, pp. 547-559.

International Search Report; International Application No. PCT/IB2016/057937International Filing Date: Dec. 22, 2016. dated May 11, 2017, 9 pages.

List of IBM Patents or Patent Applications Treated as Related; Date Filed: Jul. 10, 2018, 2 pages.

* cited by examiner

SYNDICATED CLOUD-BASED NOTIFICATION AS A SERVICE

BACKGROUND

Embodiments of the present invention relate to cloud-based notifications and, more specifically, to syndicated cloud-based notification as a service.

For many internet and intranet users, there is an overwhelming amount of content available online, which makes it difficult for users to determine which content matches their interests. Some websites partially address this problem by enabling subscriptions to their content.

The subscriptions take various forms. Some websites have subscription infrastructures that allow users to get email notifications when specific content has changed. Another common implementation is the use of Rich Site Summary (RSS) feeds, which allow users to subscribe to websites. Many website publishing applications include built-in tools or enable add-ons that automatically generate RSS feeds based on new content. An RSS client used by the user periodically polls the RSS feeds of each website to which a user is subscribed and notifies the user of new content.

These forms of notification have numerous drawbacks. They do not allow users to choose multiple ways to be notified. Rather, users are notified via email or through an application associated with their RSS clients. Further, users are unable to select specific categories of content for each website. As a result, a user must sort through unwanted content on websites to which he has subscribed, to identify the subset of that content that fits his interests.

In short, existing notification systems are inconvenient and fail over-inclusive in the content they deliver.

SUMMARY

According to an embodiment of this disclosure, a computer-implemented method includes monitoring, by a computer processor, a content source of a content provider. That monitoring includes periodically reading a Notification as a Service (NaaS) extension in a Rich Site Summary (RSS) feed associated with the content source, where the NaaS extension defines a plurality of interest categories of the content source. New content is identified in the content source, based on periodically reading the NaaS extension, and the new content is associated with a first interest category of the plurality of interest categories. A user is identified as being subscribed to receive notifications of content changes in the first interest category. The user is notified of the new content, responsive to the new content being associated with the first interest category and the user being subscribed to receive notification of content changes in the first interest category.

In another embodiment, a system includes a memory having computer readable instructions and one or more processors for executing the computer readable instructions. The computer readable instructions include monitoring a content source of a content provider. That monitoring includes periodically reading a Notification as a NaaS extension in an RSS feed associated with the content source, where the NaaS extension defines a plurality of interest categories of the content source. Further according to the computer readable instructions, new content is identified in the content source, based on periodically reading the NaaS extension, and the new content is associated with a first interest category of the plurality of interest categories. A user is identified as being subscribed to receive notifications of content changes in the first interest category. The user is notified of the new content, responsive to the new content being associated with the first interest category and the user being subscribed to receive notification of content changes in the first interest category.

In yet another embodiment, a computer program product for notifying of content changes includes a computer readable storage medium having program instructions embodied therewith. The program instructions are executable by a processor to cause the processor to perform a method. The method includes monitoring a content source of a content provider. That monitoring includes periodically reading a NaaS extension in an RSS feed associated with the content source, where the NaaS extension defines a plurality of interest categories of the content source. Further according to the method, new content is identified in the content source, based on periodically reading the NaaS extension, and the new content is associated with a first interest category of the plurality of interest categories. A user is identified as being subscribed to receive notifications of content changes in the first interest category. The user is notified of the new content, responsive to the new content being associated with the first interest category and the user being subscribed to receive notification of content changes in the first interest category.

An advantage of these embodiments is the ability to use a NaaS extension of an RSS feed to monitor a content source for new content as well as for information about interest categories selected by a content provider. Because the content provider likely already uses an RSS feed, the burden to content providers is low, and the content provider has a means for disseminating its information in a way that is convenient to its users, thus increasing usability and retaining those users.

Additionally, some embodiments include storing the plurality of interest categories in a schema storage, and transmitting a list of the plurality of interest categories to an interest widget displayed in association with the content source. Through this interest widget, a user's selection of the first interest category may be received. Thus, such embodiments have the advantage of providing an interest widget that users can use to subscribe to interest categories, where those interest categories are specific to the content provider and communicated by way of the NaaS extension.

Further, some embodiments may include identifying a schema change in the content source, based on periodically reading the NaaS extension. The plurality of interest categories may be updated as stored in the schema storage, responsive to the schema change. The interest widget may be updated, responsive to updating the plurality of interest categories. Thus, such embodiments have the advantage of automatically updating the interest widget to keep the interest widget current, thereby allowing users to subscribe to the content provider's current interest categories, as they change over time.

In some embodiments, the NaaS extension in the RSS feed further provides a set of available notification options. The set of available notification options may be stored in a schema storage, and may be transmitted to an interest widget displayed in association with the content source. At the interest widget, a selection of a first notification among the set of available notification options may be received from the user. Further, notifying the user of the new content may include using the first notification option, responsive to the user's selection of the first notification option. As a result, such embodiments enable an interest widget to provide a list of notification options based on the NaaS extension, and the user can use the interest widget to select a notification option that is available with the content provider.

Further, some embodiments include identifying a schema change in the content source, based on the periodically reading the NaaS extension. The set of available notification options may be updated as stored in the schema storage, responsive to the schema change. The interest widget may be updated responsive to updating the set of available notification options as stored in the schema storage. An advantage of such embodiments is the ability to keep the interest widget updated with the currently available notification options of the content provider, even as those notification options change over time.

Further, some embodiments may monitor other content sources of other content providers, where that monitoring includes periodically reading other NaaS extensions of other RSS feeds associated with those other content sources. The other NaaS extensions may define other interest categories of the other content sources. This may have the advantage of forming a service for multiple content providers, thus using economies of scale, where each content provider can describe its own interest categories in the NaaS extension of its RSS feed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of a notification system according to this disclosure provide a Notification as a Service (NaaS) infrastructure to notify users only of the categories of content that interest them, where those categories can vary across content providers, and where the notifications arrive through the users' preferred channels. In a more general sense, the notification system may monitor updates to various sources, such as websites, by way of a NaaS extension included in Rich Site Summary (RSS) feeds, and may thus notify users of selected data based on that monitoring.

Conventionally, content providers are limited in their mechanisms for notifying users of new content. Further, they are generally unable to notify users by way of more than a single communication channel, which is usually email.

The notification system may reduce the time and cost associated with adding new notification channels to an existing or new content source. Creating or updating a notification service for an individual content provider can be time consuming and expensive because of the resources needed to develop and test a new notification channel. Many organizations do not have the necessary resources. However, some embodiments of the notification system may utilize economies of scale and time advantages because the cost of implementing the basic infrastructure needed for the NaaS may be spread across multiple content providers.

Figure 1:
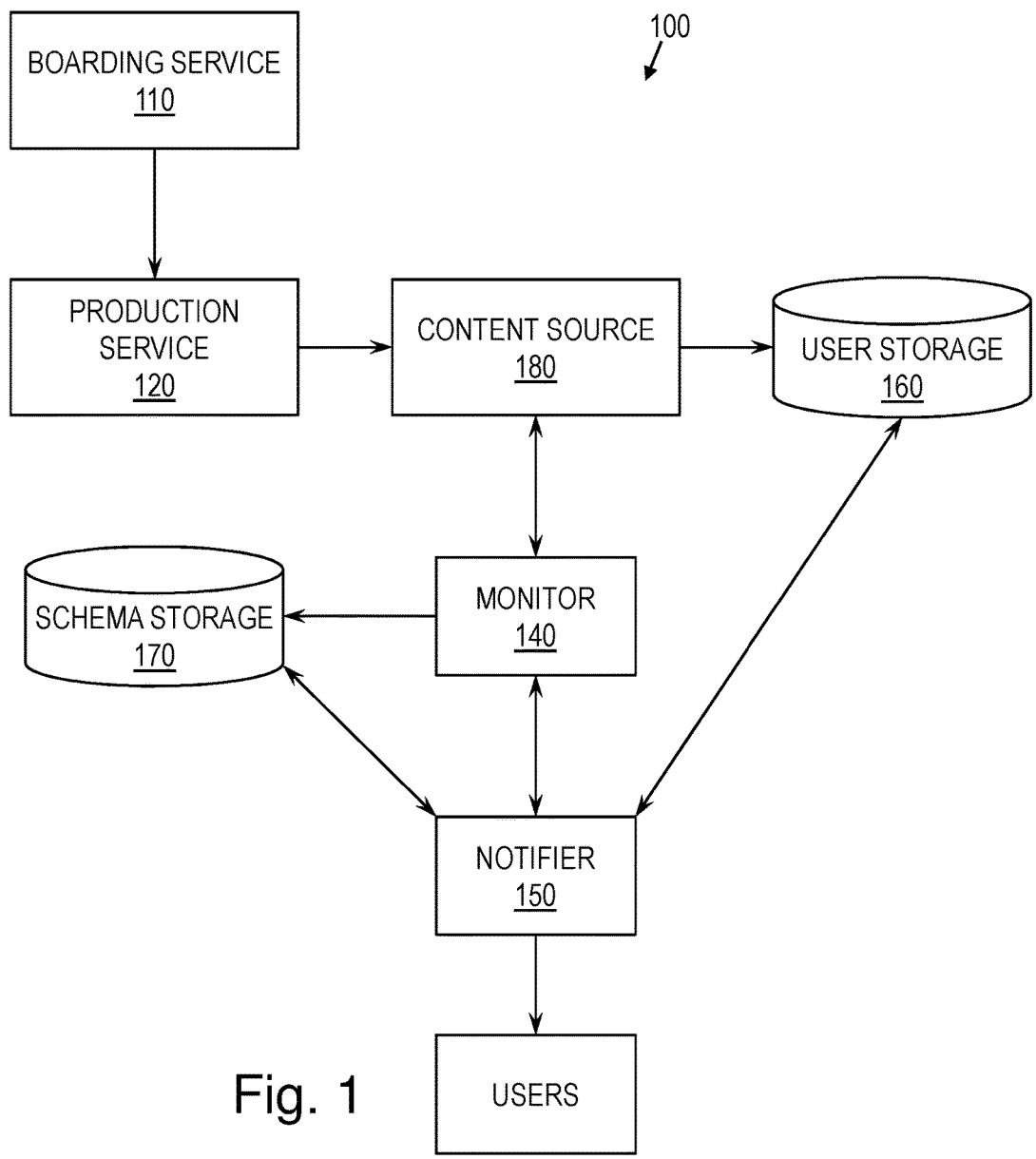
FIG. 1 is a diagram of a notification system, according to some embodiments of this disclosure.

FIG. 1 is a diagram of a notification system 100, according to some embodiments of this disclosure. The notification system 100 may implement the NaaS, which may be an infrastructure for notifying users of new content according to the users' preferences.

As shown, the notification system 100 may include a boarding service 110, a production service 120, a monitor 140, and a notifier 150. In some embodiments, these components may be cloud services implemented by the use of one or more clouds. For instance, the boarding service 110 may include one or more servers forming a first cloud, and the production service 120 may include one or more servers forming a second cloud. Further, the monitor 140 and notifier 150 may each be associated with a distinct cloud. However, it will be understood that some embodiments may have these components arranged differently. For instance, in some embodiments, the boarding service 110, production service 120, monitor 140, and notifier 150 may share hardware, software or both, thus forming a single cloud.

The notification system 100 may further include a user storage 160 and a schema storage 170. The user storage 160 may store a user record for each user subscribed to content from at least one of the content providers. The user record of a user may indicate the interest categories selected by the user for each content provider to which the user is subscribed. Further, in some embodiments, the user record may include pending notifications that have yet to be sent to the user. The schema storage may store a schema for each content provider, where that schema may include definitions of interest categories as well as available notification options for the content provider.

Generally, the boarding service 110 may enable a content provider to register its content source 180, such as a website, with the notification system 100; the production service 120 may enable provisioning and activation of the NaaS provided by the notification system 100; the monitor 140 may monitor content sources 180 for changes to content and for changes to schemas stored in the schema storage 170; and the notifier 150 may match users with their specified interest categories stored in the user storage 160 to notify those users of new content.

Figure 2:
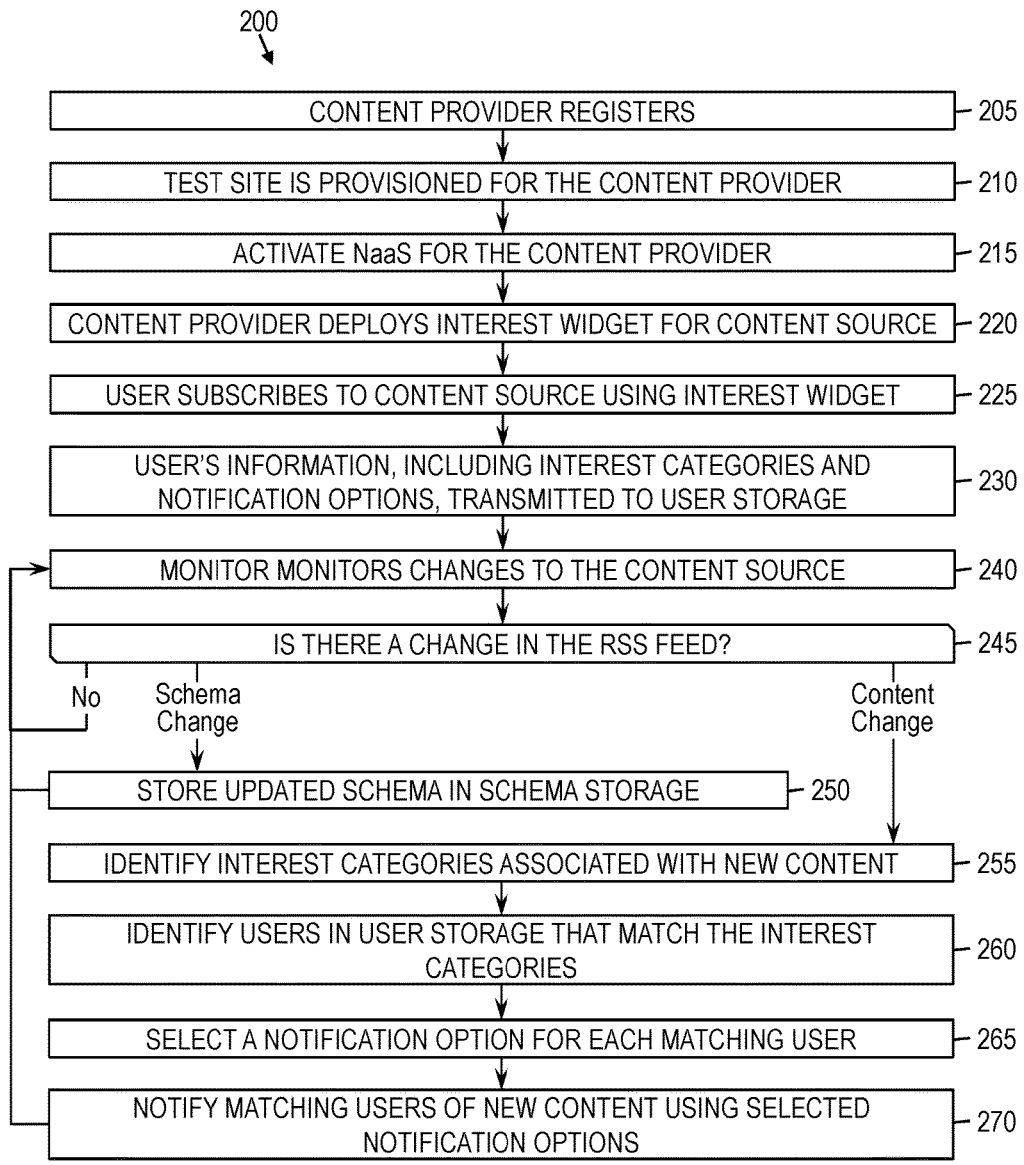
FIG. 2 is a flow diagram of a method for notifying users of new content, according to some embodiments of this disclosure.

FIG. 2 is a flow diagram of a method 200 for notifying users of new content, according to some embodiments of this disclosure.

At block 205, a content provider registers to use the notification system 100. At block 210, in some embodiments, a test site may be provisioned for the content provider. The test site may be an operable website requiring credentials to use. Once the credentials have been entered, a test user may subscribe to content and receive notifications by way of the notification system 100. With the test site, the content provider can privately modify its settings (e.g., its schema) with respect to the NaaS. In some embodiments, before the notification system 100 is activated for the content provider, the content provider may be required to accept terms and conditions of the NaaS. At block 215, the notification system 100 may activate the NaaS for the content provider. At block 220, the content provider may deploy an interest widget on its website. Later, a user may use the interest widget to select interest categories within the content provider's content.

Figure 3:
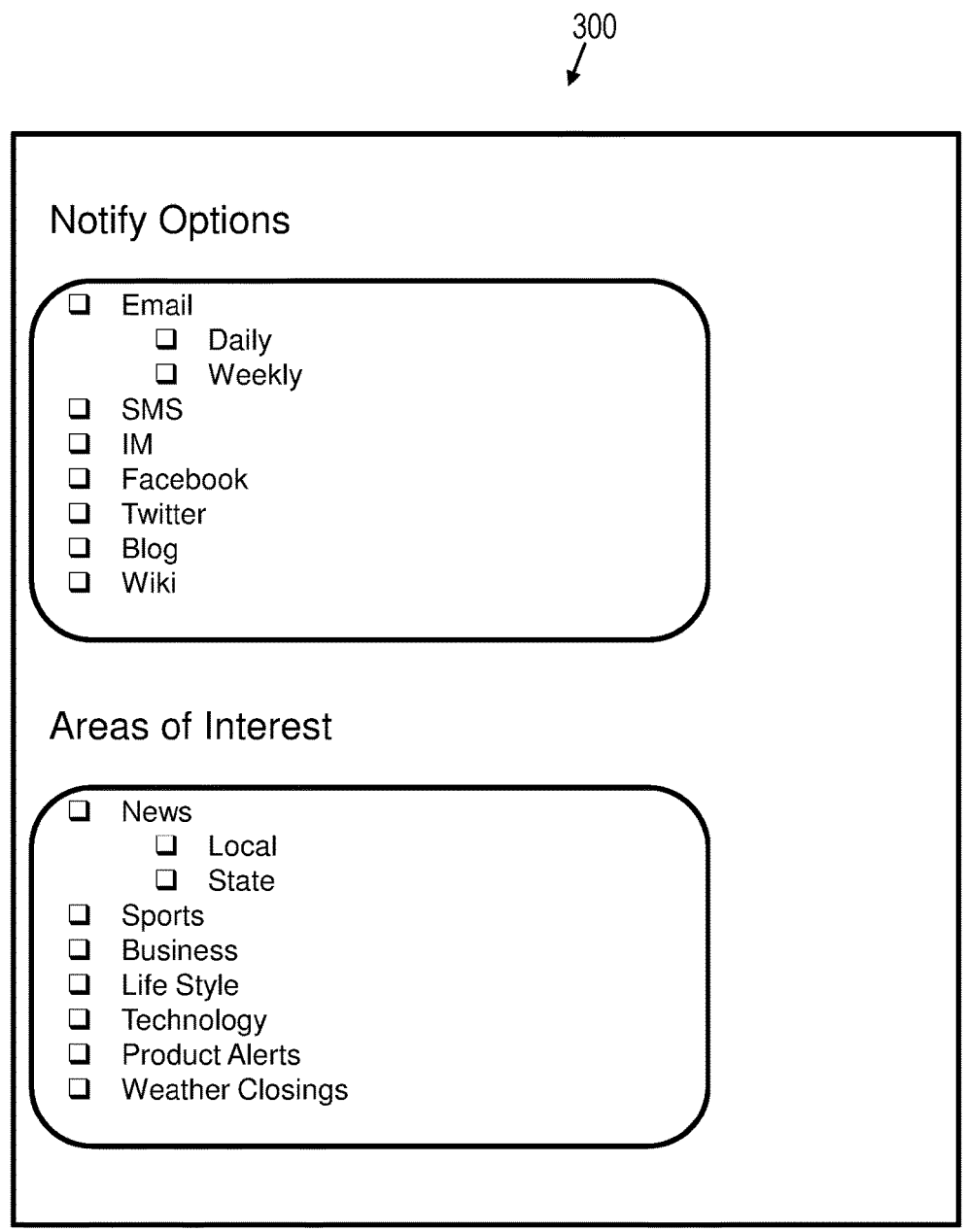
FIG. 3 illustrates an example interest widget, according to some embodiments of this disclosure.

FIG. 3 illustrates an example interest widget 300, according to some embodiments of this disclosure. In some embodiments, the interest widget 300 may enable the user to select interest categories as well as notification options. To this end, upon loading, the interest widget 300 may receive data describing the current schema of the content source 180 as stored on the schema storage 170. The interest widget 300 may thus provide a current list of selectable interest categories and notification options, and the user may make selections within the interest widget 300. The notification options may include, for example, email, short message service (SMS) text message, instant message, Facebook, Twitter, blog, wiki, or a combination of these and other options. The set of available interest categories may be selected by the content provider and need not match up with those of other content providers who use the NaaS and the notification system 100. Thus, compared to existing notification mechanisms, some embodiments of the notification system 100 have the advantage of being customized to content providers without having to fit content providers' interest categories into common categories used across all content providers.

Referring back to FIG. 2, at block 225, a user may subscribe at the website of the content provider, using the interest widget 300. Specifically, for instance, the user may use the interest widget 300 to select one or more interest categories of the content provider and to select one or more notification options. At block 230, based on use of the interest widget 300, information about the user may be transmitted to the user storage 160 to provide an updated user record for the user in the user storage 160. This information may include identifying information about the user, the user's selected notification options as well as contact information for using those notification options, and the user's selected interest categories. In some instances, such as when the user did not previously have a record in the user storage 160, providing the updated user record may include adding to the user storage 160 a user record for the user. The user record may indicate the user's selected one or more interest categories and one or more notification options for the website. Due to the user record, in some embodiments, the notification system 100 is able to notify the user of new content that falls into the selected interest categories, and that notification may be sent according to the user's selected notification options.

The interest categories selected by users may be used by content providers as a source of insight into user interest areas. Thus, in some embodiments, each content provider may have access to data about which users subscribed to which interest categories it offers, or the content provider may have access to more general statistical data describing the subscriptions. With this data, the content provider may tailor or prioritize its publications based on, for example, which interest categories are frequently selected by users.

At block 240, the monitor 140 may monitor changes to the content and the schema of the content provider. To this end, the monitor 140 may periodically check the RSS feed of the content source 180 for changes. As is conventionally the case, the RSS feed may indicate changes to the content of the website. Further, as discussed above, the NaaS extension of the RSS feed may define the current schema. Further, within the RSS feed, each piece of content (e.g., each article or blog post) may be associated with one or more interest categories.

Although only a single content source 180 is shown in FIG. 1, it will be understood that one or more content providers may be registered with the notification system 100, and thus the monitor 140 may monitor one or more RSS feeds associated with one or more content sources 180 of one or more content providers. Further, in some embodiments, the monitor 140 may be implemented as two distinct monitors, a schema-change monitor to identify changes to the schema and a content monitor to identify changes to the content of the website.

The content provider may occasionally make changes to the content on its content source 180, or to its schema. For example, such a change may be in the form of posting new content, such as a new article or blog post. This change to its content may be reflected in an associated RSS feed for the content source 180. The RSS feed may also indicate one or more interest categories associated with each new piece of content on its content source 180.

To participate in the notification system, the content provider may be required to include a NaaS extension in its RSS feed. The NaaS extension may be a section of the RSS feed defining the content provider's schema, which includes its interest categories and available notification options. For instance, if the content provider has a hierarchy of categories and subcategories, this hierarchy may be defined in the NaaS section. When changes to the schema occur, the NaaS section of the RSS feed may be changed accordingly. As with conventional RSS feeds, the NaaS extension may be written in XML format. Further, in some embodiments, inclusion of the NaaS extension may leave the remainder of the RSS feed intact, thus enabling traditional RSS clients to gather from the RSS feed the data they would normally gather.

At decision block 245, it may be determined whether a change is found in the RSS feed and, if so, what type of change (i.e., a change to the schema or a change to the content). If no change is identified, then the monitor 140 may continue monitoring the RSS feed at block 240.

If a schema change is identified, then at block 250, the notification system may store an updated version of the schema in the schema storage 170. Adding an updated version may include modifying the schema currently stored for the content provider, or in the case of a newly registered content provider, this may include adding the schema to the schema storage 170.

In some embodiments, the schema stored for a content provider in the schema storage 170 may be changed by other mechanisms, in addition or alternatively to being changed in the NaaS extension. For example, and not by way of limitation, the content provider may push a schema change to the notification system 100. Upon receiving this schema change, the notification system 100 may update the schema stored in the schema storage 170 accordingly.

Because the interest widget 300 may receive data about the schema as stored in the schema storage 170, modifying the schema in the schema storage 170 may likewise modify the interest widget 300 to reflect the current interest categories and available notification options. Upon updating the schema, the method 200 may then return to block 240, where the monitor 140 may continue monitoring the RSS feed.

If a content change is identified, then at block 255 the monitor may identify in the RSS feed one or more interest categories associated new content. At block 260, the notification system 100 may identify users that match the interest categories of the new content. To this end, the notifier 150 may compare the interest categories of the new content to the interest categories of various users represented by user records in the user storage 160, and may identify as a matching user each user who indicated interest in at least one interest category of the new content.

In some embodiments, matching users may include one or more users who did not explicitly select any of the interest categories of the new content, but otherwise indicated that they might be interested in the new content. For instance, the notification system 100 may apply analytics to determine which new content might interest users. The notification system 100 may intuit, based on a user's selected interest categories of a provider, whether other interest categories or, specifically, the new content might be of interest to the user. If it is determined that the user might be interested, despite not having explicitly selected an interest category applicable to the new content, then the user may be identified as a matching user. In some embodiments, this feature may apply only to users who have indicated they would like to participate, such as by having selected a "broaden your search" option or the like on the interest widget 300.

At block 265, for each matching user, the notifier 150 may select at least one notification option, which may be selected from the notification options previously chosen by the user through the interest widget 300 or through other means. At block 270, to each matching user, the notifier 150 may send a notification of the new content using the selected notification option for that matching user.

In some embodiments, for instance if the matching user indicated a desire to receive notifications according to a specific schedule, such as a desired frequency of notifications, the notification may be postponed for a later time so as to comply with that schedule. In that case, the notification may be stored in the user record of the user as a pending notification. Further, in that case, multiple notifications for a single user may be combined and sent together as a consolidated notification at a time that complies with the schedule. However, there may be instances in which the content provider desires to override a user's schedule for receiving notifications, such as due to urgency related to the new content. In that case, the content provider may indicate in the NaaS extension that the new content is urgent, and notifications for the new content may therefore be sent without postponement due to user schedules.

The method 200 may then return to block 240, where the monitor 140 may continue monitoring the RSS feed.

Figure 4:
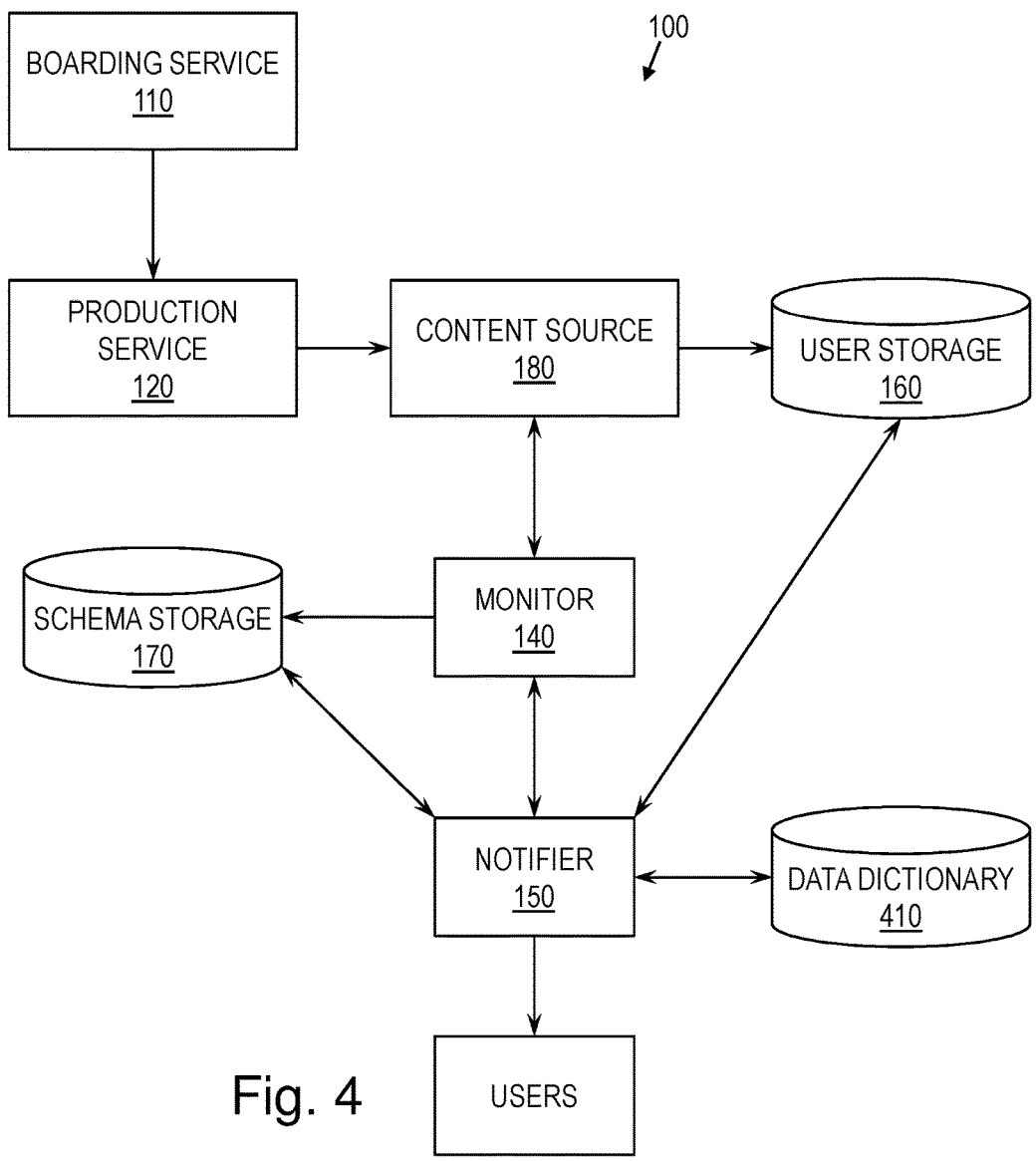
FIG. 4 is another diagram of the notification system, according to some embodiments of this disclosure.

In some embodiments, the notification system 100 may enable cross-provider collaboration of interest categories, grammars, keywords, or other aspects. Illustrating this concept, FIG. 4 is another diagram of the notification system 100, according to some embodiments of this disclosure.

The various content providers may collaborate on synonyms for their interest categories. For example, and not by way of limitation, an online voting system may be used, where content providers can submit an interest category affiliation (i.e., requesting that a certain interest category be considered the same as one or more other interest categories already established as synonyms) for voting by other content providers. If enough up-votes are received, then the interest category in question may be added to a data dictionary 410 in which synonymous interest categories are grouped together and thereby considered the same for purposes of notifying users. When the monitor 140 identifies new content form a content provider, and that new content is associated with one or more interest categories specified by the content provider, the notifier 150 may search the data dictionary 410 for synonymous interest categories. If one or more synonymous interest categories are identified, those as well as the specified interest categories for the new content may be used to identify matching users. Thus, even users who did not subscribe to the content provider may receive notifications regarding new content of the content provider, where that new content is associated with at least one interest category synonymous with one selected by the user for a different content provider. In some embodiments, this feature may apply only to users who have indicated they would like to participate, such as by having selected an "allow collaboration with other sources" option or the like on the interest widget 300.

Embodiments of the notification system 100 need not be limited to monitoring and notifying based on website content. Rather, for example, some embodiments may monitor social media channels and may notify users based on content changes to those social media channels. Given the popularity of social media, such embodiments may be advantageous in that they may enable notifications of data provided through social media channels. Many organizations post to their social media channels more frequently than they update their websites. Further, because of the ease of posting on social media, a content provider may provide new content on social media prior to providing that same new content on its website, and in that case, notifications based on the new social media content may provide more timely information to users.

Figure 5:
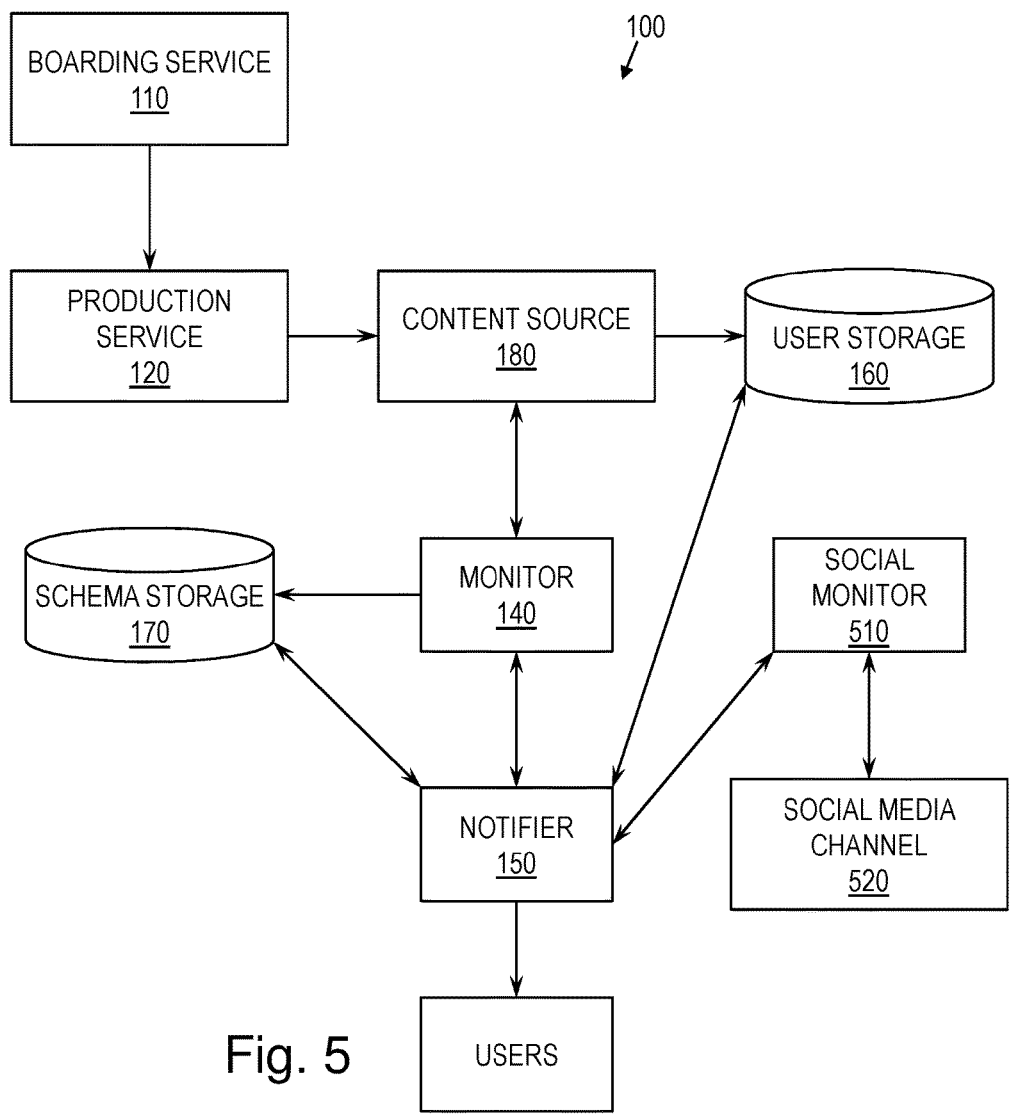
FIG. 5 is yet another diagram of the notification system, according to some embodiments of this disclosure.

FIG. 5 is yet another diagram of the notification system 100, according to some embodiments of this disclosure. As shown, the notification system 100 may further include a social monitor 510, which may monitor one or more social media channels 520 for content changes.

Figure 6:
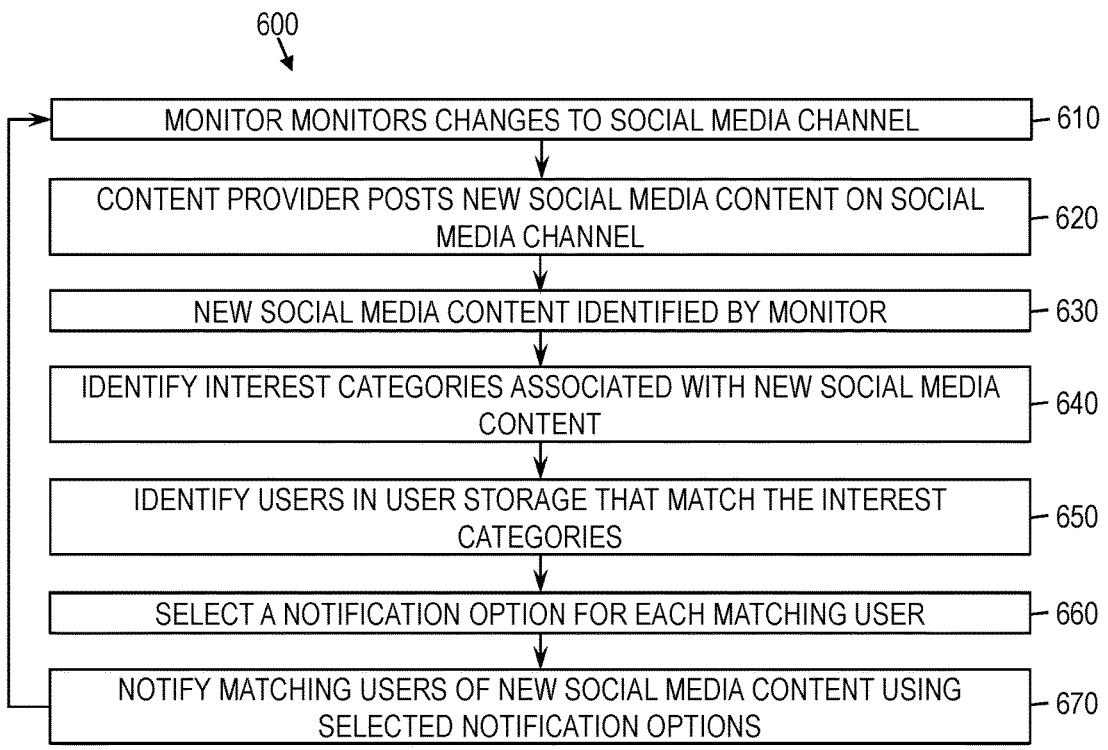
FIG. 6 is a flow diagram of a method for notifying users of social media activity, according to some embodiments of this disclosure.

FIG. 6 is a flow diagram of a method 600 for notifying users of social media activity, according to some embodiments of this disclosure. In some embodiments, when this method 600 begins, a content provider may already be registered with the notification system 100 and may already be represented in the schema storage 170. In other words, the notification system 100 may already be aware of the content provider's interest categories and notification options. Further, this method 600 may be supplemental to the method 200 described above for providing notifications based on changes to other content sources 180, such as websites. Thus, as discussed above, the NaaS extension may be provided in an RSS feed and monitored by the notification system 100 so as to ensure that the schema for the content provider as stored in the schema storage 170 remains current.

At block 610, the social monitor 510 may monitor one or more social media channels 520 of the content provider. This monitoring may continue until a content change, such as new social media content, is identified.

At block 620, the content provider may post social media content. The social media content may include one or more individual posts together being considered a single piece of content. For instance, where the social media content is posted on Twitter, which limits each tweet to 140 characters, the social media content may be a series of tweets labeled to indicate they form a single social medial content. For example, and not by way of limitation, one such tweet may include a label such as "(1/3)," indicating that the tweet is the first of three tweets forming a single social media content. In or associated with the social media content, the content provider may indicate one or more interest categories, which may be among the interest categories defined in the schema associated with the content provider.

At block 630, new social media content may be identified by the social monitor 510. At block 640, the social monitor 510 may identify in the new social media content one or more interest categories associated with the new social media content. At block 650, the notification system 100 may identify users that match the interest categories of the new social media content. To this end, the notifier 150 may compare the interest categories of the new social media content to the interest categories of various users represented in the user storage 160, and may identify as a matching user each user who indicted interest in at least one interest category of the new social media content.

At block 660, for each matching user, the notifier 150 may select at least one notification option, which may be selected from the notification options previously chosen by the user through the interest widget 300 or through other means. At block 670, to each matching user, the notifier 150 may send a notification of the new social media content using the selected notification option for that matching user. In some embodiments, for instance if the matching user indicated a desire to receive notifications according to a specific schedule or frequency, the notification may be postponed for a later time so as to comply with that schedule or frequency. Further, in that case, multiple notifications for a single user may be combined and sent together as a consolidated notification at a time complying with the schedule or frequency.

The method 600 may then return to block 610, where the social monitor 510 may continue monitoring the social media channels.

Figure 7:
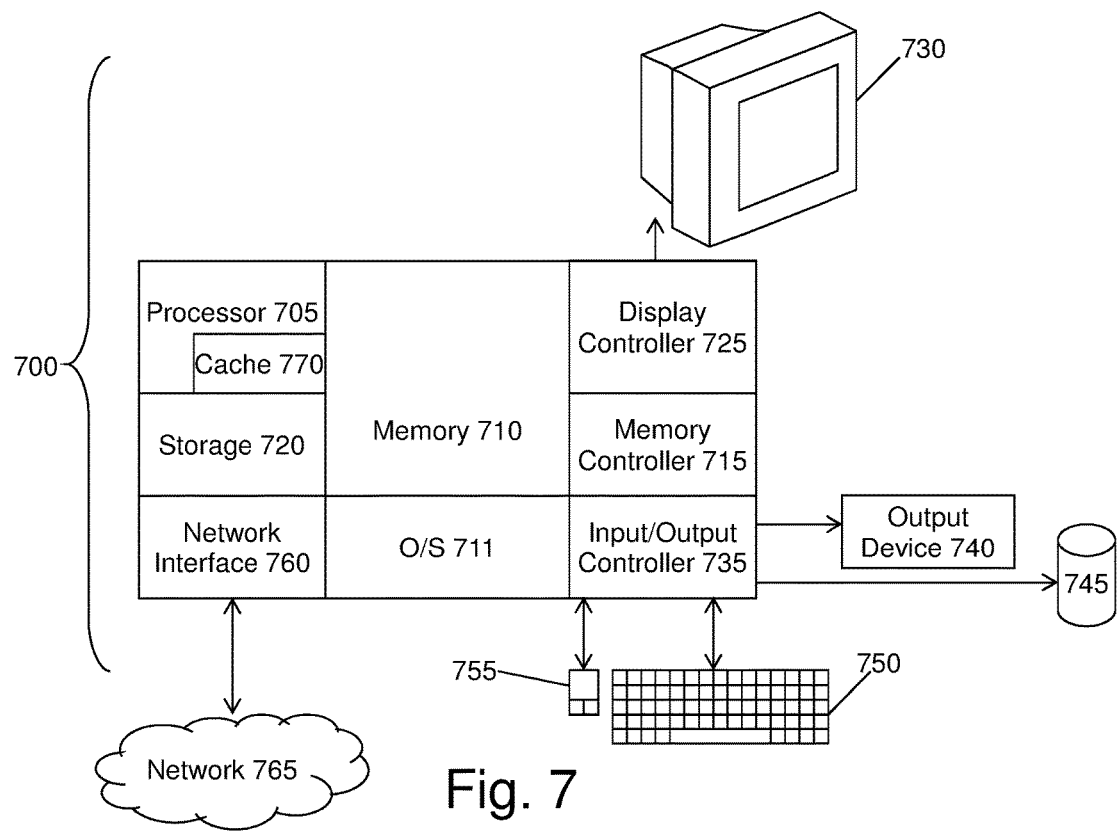
FIG. 7 is a block diagram of a computer system for implementing some or all aspects of the notification system, according to some embodiments of this disclosure.

FIG. 7 illustrates a block diagram of a computer system 700 for use in implementing a notification system 100 or method according to some embodiments. The notification systems 100 and methods described herein may be 420 implemented in hardware, software (e.g., firmware), or a combination thereof. In some embodiments, the methods described may be implemented, at least in part, in hardware and may be part of the microprocessor of a special or general-purpose computer system 700, such as a personal computer, workstation, minicomputer, or mainframe computer. For instance, the boarding service 110, the production service 120, the monitor 140, and the notifier 150 may be implemented on one or more computer systems 700.

In some embodiments, as shown in FIG. 7, the computer system 700 includes a processor 705, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid state drive. The stored instructions in memory 710 or in storage 720 may include those enabling the processor to execute one or more aspects of the notification systems 100 and methods of this disclosure.

The computer system 700 may further include a display controller 725 coupled to a display 730. In some embodiments, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In some embodiments, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Notification systems and methods according to this disclosure may be embodied, in whole or in part, in computer program products or in computer systems 700, such as that illustrated in FIG. 7.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
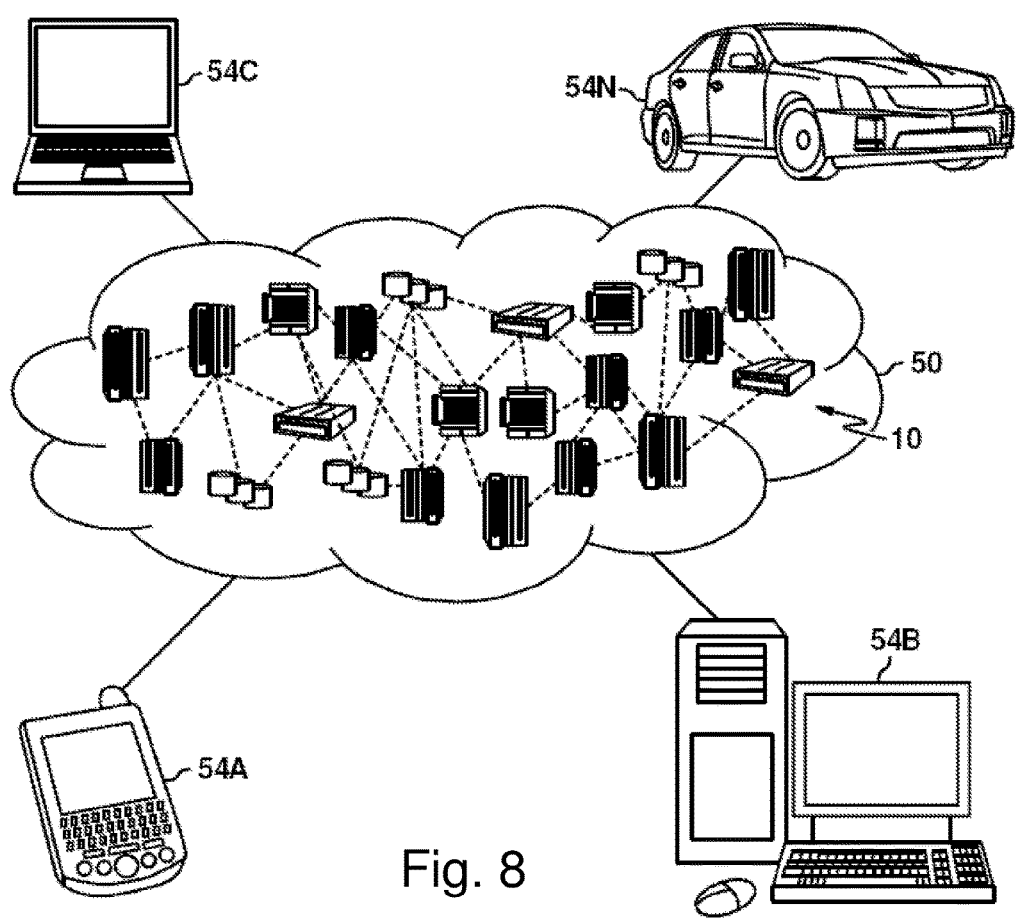
FIG. 8 depicts a cloud computing environment, according to some embodiments of this disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
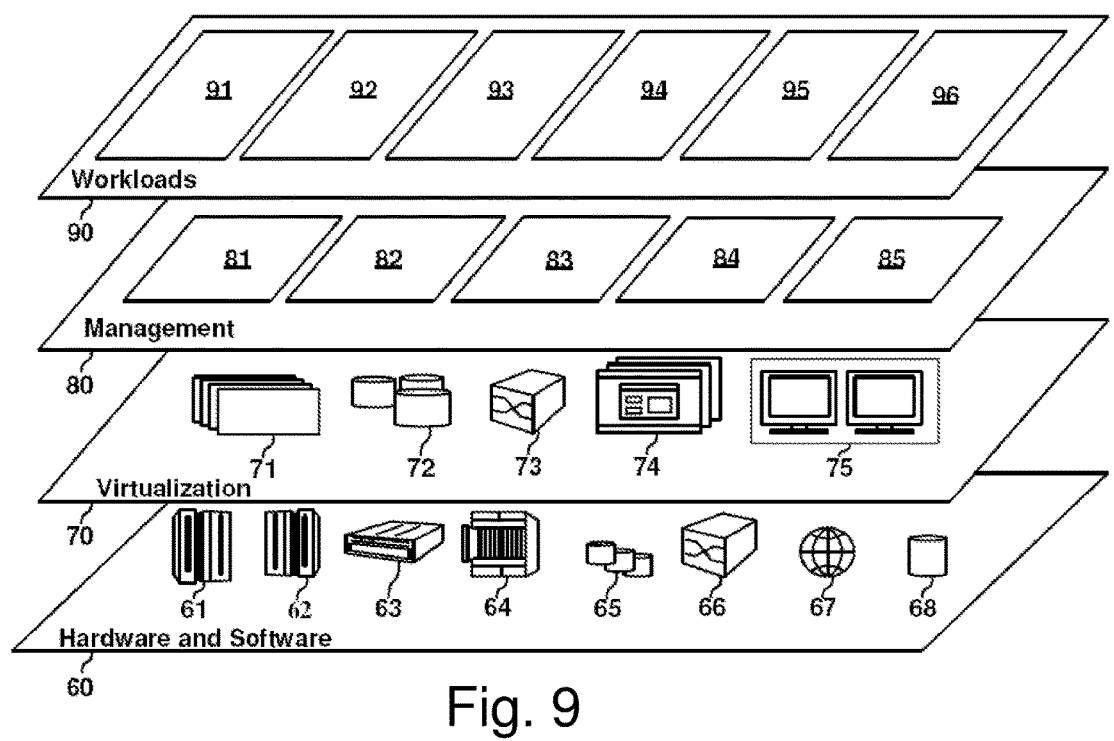
FIG. 9 depicts abstraction model layers, according to some embodiments of this disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring content sources by reading NaaS extensions of RSS feeds 96.

Technical effects and benefits of some embodiments include the ability to monitor one or more data streams, such as RSS feeds or social media channels, to identify new content within those data streams. Further, some embodiments may send notifications of the new content across pre-selected communication channels based on users' pre-selected interests and notification preferences. As a result, content providers may be able to maintain their own categories, which may be communicated to the notification system through their RSS feeds.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for notifying of content changes, comprising:
a memory having computer readable instructions; and
one or more processors for executing the computer readable instructions, the computer readable instructions comprising:
monitoring a content source of a content provider, wherein the monitoring comprises:
periodically reading a Notification as a Service (NaaS) extension in a Rich Site Summary (RSS) feed associated with the content source, wherein the NaaS extension in the RSS feed further provides a set of available notification options and wherein the NaaS extension defines a current schema defining a plurality of interest categories of the content source;
wherein the NaaS extension defines a current schema defining a plurality of interest categories of the content source;
identifying a schema change in the content source, based on the periodically reading the NaaS extension, wherein the schema change is associated with a first interest category of the plurality of interest categories of the content source;
in response to identifying the schema change in the content source, based on the periodically reading the NaaS extension, identifying a user subscribed to receive notifications of content changes in the first interest category; and
storing the set of available notification options in a schema storage;
transmitting the set of notification options to an interest widget displayed in association with the content source;
receiving from the user at the interest widget a selection of a first notification option among the set of available notification options; and
notifying the user of changes in the plurality of interest categories at the content source, responsive to the schema change identified from the periodically reading of the NaaS extension, wherein the notifying the user of the schema change comprises using the first notification option, responsive to the user's selection of the first notification option.

2. The system of claim 1, the computer readable instructions further comprising:
storing the plurality of interest categories in a schema storage;
transmitting a list of the plurality of interest categories to an interest widget displayed in association with the content source; and receiving from the user at the interest widget a selection of the first interest category.

3. The system of claim 2, the computer readable instructions further comprising:
   updating the plurality of interest categories as stored in the schema storage, responsive to the schema change; and
   updating the interest widget responsive to updating the plurality of interest categories as stored in the schema storage.

4. The system of claim 1, the computer readable instructions further comprising:
   populating a data dictionary with synonyms of a plurality of interest categories, wherein the populating is performed based on a collaboration among a plurality of content providers;
   identifying a second user subscribed to receive notifications of content changes in a second interest category;
   determining that the second interest category is synonymous with the first interest category, wherein the determining is performed by searching the data dictionary for synonyms of the first interest category; and
   notifying the second user of the schema change, responsive to the schema change being associated with the first interest category and the second user being subscribed to receive notification of content changes in the second interest category.

5. The system of claim 1, the computer readable instructions further comprising:
   updating the set of available notification options as stored in the schema storage, responsive to the schema change; and
   updating the interest widget responsive to updating the set of available notification options as stored in the schema storage.

6. The system of claim 1, the computer readable instructions further comprising monitoring a plurality of other content sources of a plurality of other content providers, wherein the monitoring the plurality of other content sources comprises: periodically reading a plurality of other NaaS extensions of a plurality of other RSS feeds associated with the plurality of other content sources; wherein the plurality of other NaaS extensions define a plurality of other interest categories of the plurality of other content sources.

7. The system of claim 6, wherein a second NaaS extension associated with a second content source defines a set of interest categories distinct from the plurality of interest categories of the content source.

8. A computer program product for notifying of content changes, the computer program product comprising a computer readable storage medium having program instructions embodied therewith, the program instructions executable by a processor to cause the processor to perform a method comprising:
   monitoring a content source of a content provider, wherein the monitoring comprises:
   periodically reading a Notification as a Service (NaaS) extension in a Rich Site Summary (RSS) feed associated with the content source, wherein the NaaS extension in the RSS feed further provides a set of available notification options and wherein the NaaS extension defines a current schema defining a plurality of interest categories of the content source;
   wherein the NaaS extension defines a current schema defining a plurality of interest categories of the content source;

identifying a schema change in the content source, based on the periodically reading the NaaS extension, wherein the schema change is associated with a first interest category of the plurality of interest categories;
   in response to identifying the schema change in the content source, based on the periodically reading the NaaS extension, identifying a user subscribed to receive notifications of content changes in the first interest category; and
   storing the set of available notification options in a schema storage;
   transmitting the set of notification options to an interest widget displayed in association with the content source;
   receiving from the user at the interest widget a selection of a first notification option among the set of available notification options; and
   wherein the notifying the user of the new content comprises using the first notification option, responsive to the user's selection of the first notification option
   notifying the user of changes in the plurality of interest categories at the content source, responsive to the schema change identified from the periodically reading of the NaaS extension, wherein the notifying the user of the new content comprises using the first notification option, responsive to the user's selection of the first notification option.

9. The computer program product of claim 8, the method further comprising:
   storing the plurality of interest categories in a schema storage;
   transmitting a list of the plurality of interest categories to an interest widget displayed in association with the content source; and
   receiving from the user at the interest widget a selection of the first interest category.

10. The computer program product of claim 9, the method further comprising:
    updating the plurality of interest categories as stored in the schema storage, responsive to the schema change; and
    updating the interest widget responsive to updating the plurality of interest categories as stored in the schema storage.

11. The computer program product of claim 8, the method further comprising:
    populating a data dictionary with synonyms of a plurality of interest categories, wherein the populating is performed based on a collaboration among a plurality of content providers;
    identifying a second user subscribed to receive notifications of content changes in a second interest category;
    determining that the second interest category is synonymous with the first interest category, wherein the determining is performed by searching the data dictionary for synonyms of the first interest category; and
    notifying the second user of the new content, responsive to the new content being associated with the first interest category and the second user being subscribed to receive notification of content changes in the second interest category.

12. The computer program product of claim 8, the method further comprising:
    updating the set of available notification options as stored in the schema storage, responsive to the schema change; and updating the interest widget responsive to updating the set of available notification options as stored in the schema storage.

13. The computer program product of claim 8, the method further comprising monitoring a plurality of other content sources of a plurality of other content providers, wherein the monitoring the plurality of other content sources comprises: periodically reading a plurality of other NaaS extensions of a plurality of other RSS feeds associated with the plurality of other content sources; wherein the plurality of other NaaS extensions define a plurality of other interest categories of the plurality of other content sources.

14. The computer program product of claim 13, wherein a second NaaS extension associated with a second content source defines a set of interest categories distinct from the plurality of interest categories of the content source.

\* \* \* \* \*